US007080004B2

(12) United States Patent
Wang et al.

(10) Patent No.: US 7,080,004 B2
(45) Date of Patent: Jul. 18, 2006

(54) GRAMMAR AUTHORING SYSTEM

(75) Inventors: Ye-Yi Wang, Redmond, WA (US); Alejandro Acero, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 901 days.

(21) Appl. No.: 10/007,439

(22) Filed: Dec. 5, 2001

(65) Prior Publication Data

US 2003/0121026 A1 Jun. 26, 2003

(51) Int. Cl.
*G06F 17/27* (2006.01)
*G06F 17/20* (2006.01)
(52) U.S. Cl. .............................. 704/9; 704/1
(58) Field of Classification Search ............... None
See application file for complete search history.

(56) References Cited

U.S. PATENT DOCUMENTS

| | | | | |
|---|---|---|---|---|
| 5,937,385 | A * | 8/1999 | Zadrozny et al. | 704/257 |
| 5,995,918 | A * | 11/1999 | Kendall et al. | 704/1 |
| 6,173,261 | B1 * | 1/2001 | Arai et al. | 704/257 |
| 6,336,214 | B1 * | 1/2002 | Sundaresan | 717/143 |
| 6,434,523 | B1 * | 8/2002 | Monaco | 704/257 |
| 2002/0099535 | A1 * | 7/2002 | Schmid et al. | 704/4 |
| 2002/0156616 | A1 * | 10/2002 | Russell | 704/4 |
| 2003/0050772 | A1 * | 3/2003 | Bennett | 704/9 |

OTHER PUBLICATIONS

Gavalda, Marsal. Waibel, Alex. "Growing Semantic Grammars", 17th International Conference on Computational Linguistics, 1998, pp. 451-456.*
Huang, X. et al. "MIPAD: A Next Generation PDA Prototype", Proceedings of the International Conference on Spoken Language Processing, Beijing China, Oct. 2000.*
A Robust Parser for Spoken Language Understanding By: Ye-Yi Wang, Microsoft Research, Redmond, WA.
Speechbuilder: Facilitating Spoken Dialogue System Development By: James Glass et al., MIT Laboratory for Computer Science, Cambridge MA.
Robust Language Understanding in MIPAD By: Ye-Yi Wang, Microsoft Research, Redmond WA.

* cited by examiner

*Primary Examiner*—David Hudspeth
*Assistant Examiner*—Matthew J Sked
(74) *Attorney, Agent, or Firm*—Westman, Champlin & Kelly, P.A.

(57) ABSTRACT

A grammar authoring system uses multiple sources of information to aid grammar authoring. This produces a semantic grammar derived semi-automatically with a relatively small amount of data.

21 Claims, 9 Drawing Sheets

GRAMMAR AUTHORING SYSTEM

BACKGROUND OF THE INVENTION

The present invention generally relates to context free grammars. More specifically, the present invention relates to an authoring system for use in authoring such grammars.

Semantic-based robust understanding technology has been widely used in human/machine conversational systems. In fact, it has been shown to be one of the most competitive technologies after many years of work in the area of spoken language understanding. However, this technology suffers from a number of disadvantages. One of the main disadvantages is the requirement for expertise in manual development of a domain-specific grammar. It is believed that this is a major obstacle faced by many developers in building a conversational system.

Researchers have attempted to remedy this problem. For instance, some researchers have been working in an attempt to develop data-driven automatic grammar inference for many years. However, the success of this type of system has been very limited due to the fundamental problem of sparse data for the complex target grammar.

A semantic context free grammar (CFG), like a syntactic CFG, defines the legal combination of individual words into constituents, and the combination of constituents into sentences. In addition, a semantic CFG must define the concepts and relationships among those concepts in a specific domain. It is this additional dimension of variation that makes it necessary to develop a grammar for every new domain.

It is also common for semantic information in such applications to be defined in a semantic schema. Semantic schema is often used for many different purposes. For example, semantic schema serves as the specification for a language-enabled application. In other words, once a semantic schema is defined, grammar and application logic development can proceed simultaneously according to the semantic schema. Semantic schema also plays a critical role in dialog management. Further, the semantic schema is language independent, in the sense that it does not specify the linguistic expressions used to express a concept. Therefore, it is used not only for language-enabling applications, but also for integrating inputs from multi-modalities, such as mouse click events. Thus, in many such applications, the semantic schema must be authored and already exists prior to the development of the CFG.

SUMMARY OF THE INVENTION

A grammar authoring system uses multiple sources of information to aid grammar authoring. This produces a semantic grammar derived semi-automatically with a relatively small amount of data.

In one embodiment, the semantic schema is first written and a template context free grammar (CFG) is automatically derived from the schema such that inherits the semantic constraints of the semantic schema. The template CFG also exhibits structural generalizations.

In another embodiment, the present invention utilizes semantic annotation to focus parser learning to points of interest. The present invention can further use syntactic constrains to reduce the learning space during grammar development. In addition, the present invention can make use of pre-existing library grammars in a highly efficient way, such as using drag and drop techniques, to develop the grammar.

BRIEF DESCRIPTION OF THE DRAWINGS

FIG. 2A illustrates a context free grammar parse tree.

FIG. 2B shows in detail the data flow for expression annotator block 212 in FIG. 2.

DETAILED DESCRIPTION OF ILLUSTRATIVE EMBODIMENTS

Figure 1:
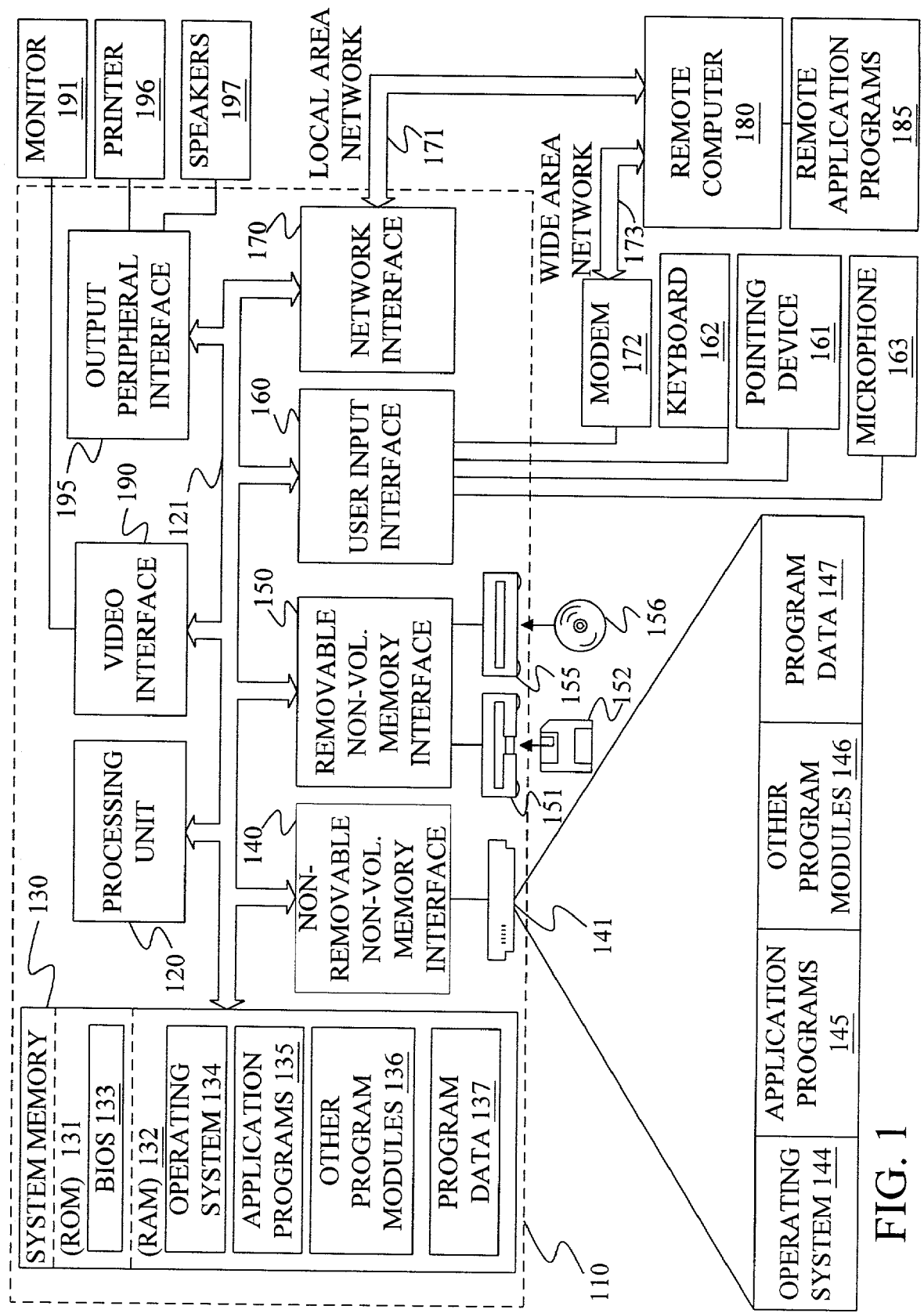
FIG. 1 is a block diagram of a personal computer which forms but one embodiment of an environment for the present invention.

The present invention is an authoring system used to assist in the authoring of a context free semantic grammar. The system can be implemented on a computing device and as a method. FIG. 1 is but one illustrative embodiment of an exemplary environment in which the present invention may be used. Of course, other environments can be used as well.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, PAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
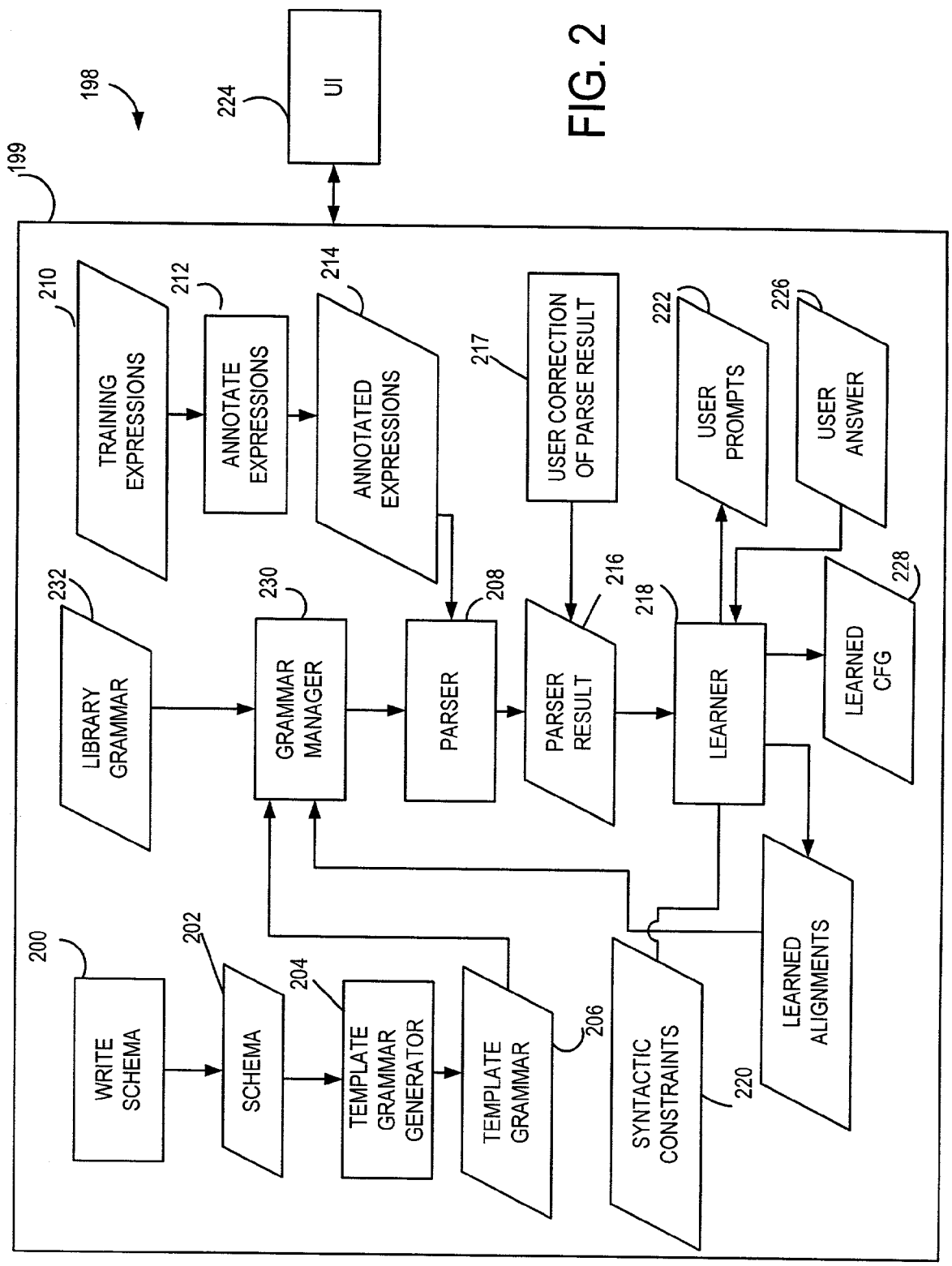
FIG. 2 is a data flow diagram illustrating the authoring of a context free grammar in accordance with one embodiment of the present invention.

FIG. 2 is a data flow diagram illustrating the generation of a context free grammar in accordance with one embodiment of the present invention. Different components shown in FIG. 2 can illustratively be implemented in the various components shown in FIG. 1. FIG. 2 is provided as an overview and the individual data flow steps will be discussed in greater detail with respect to FIGS. 3–10. FIG. 2 shows system 198 which includes a front end, or user interface (UI) 224, and a back end 199. Back end 199 includes a template grammar generation component 204, parser 208, learner 218 and grammar manager 230.

In operation, the semantic schema for the system is first written. This is indicated by block 200. The schematic schema is a relatively high level, and relatively simple, semantic description of the relationships among different concepts in the domain specific application. For example, the semantic schema for even a relatively complex application can be written in several hours. The semantic schema is illustrated by block 202 in FIG. 2.

Semantic schema is not a grammar. It is not sufficient to use a schema to analyze a natural language input. To correctly interpret the meaning of a natural language expression, a parser is used to map the expression against the schema according to a context free grammar (CFG). For instance, the schema may contain the following definition of a semantic class:

```
<entity name="ApptByAttributes" type="Appointment">
    <slot type="Time" name="StartTime" />
    <slot type="Time" name="EndTime" />
    <slot type="Person" name="Attendees" />
</entity>
```

The semantic class simply defines a semantic concept "ApptByAttributes", which is a specific way to refer to an "Appointment", the type of "ApptByAttributes". To refer to an existing appointment with this concept, a speaker has to specify one or more of the slots of the concept to differentiate it from other existing appointments. For example, "the meeting from 3 to 5 with Alex" is an expression for the concept. To understand the phrase correctly, we need to identify its semantic structure, which maps the words in the phrase to the constituents in the semantic class:

```
<entity name="ApptByAttributes" type="Appointment">
    <slot type="Time" name="StartTime" text="3" />
    <slot type="Time" name="EndTime" text="5" />
    <slot type="Person" name="Attendees"
        text="Alex"/>
</entity>
```

To identify the correct interpretation above, we need a grammar that lets the parser know that "3" and "5" are "Time"s, "Alex" is a "Person", and "3" is the "StartTime", "5" is the "EndTime" in the context. Further, the grammar distinguishes this expression from other expressions that also contain time expressions, such as "the flights between 9 am and 3 pm" and only accept the former expression as an "ApptByAttributes". An example grammar may look like:

<ApptByAttributes>→the meeting <ApptAttributes>

<ApptAttributes>→<ApptAttribute> <ApptAttributes>

<ApptAttributes>→<ApptAttribute>

<ApptAttribute>→from <Time>:StartTime

<ApptAttribute>→to <Time>:EndTime

<ApptAttribute>→with <Person>:Attendee

<Person>→Alex|john|Dave| . . .

<Time>→1|2|3|4|5| . . .

Given the aforementioned grammar, a robust parser can map the input expression into a CFG parse tree 203 as in FIG. 2A. From this CFG parse tree the aforementioned semantic structure can be constructed. The semantic structure is an abstraction of the CFG parse tree that hides all the details about the applications of the CFG rules in deriving the tree.

Clearly, the grammar contains the detailed linguistic information that describes how to express concepts in a schema, and how to combine simple concepts into a complex one with natural language. The task of grammar development, therefore, is far more difficult than describing the conceptual relationships of a domain in a semantic schema. However, the grammar authoring experience can be greatly improved with the information from schema, grammar library and sample annotations.

Once schema 202 has been written, a template CFG is produced from the schema with an automatic template grammar generation component 204, as discussed below. The template CFG inherits the semantic constraints from the semantic schema. This is done by assuming that the linguistic constraints that guide the integration of smaller units into a larger unit in the CFG are invariants for languages used in human-computer interaction. In the template CFG, each semantic class has a corresponding CFG non-terminal, and there are also many other non-terminals and pre-terminals that define language structures. Many pre-terminals are initially placeholders and not associated with any terminals. Hence, the template CFG is greatly under-specified. The template grammar is indicated by block 206.

The under-specified template grammar 206 can be augmented in two ways. The first is through the use of a grammar library. Grammar manager 230 has access to a library of pre-existing grammars 232. Grammar manager 230 associates specific grammars in the library of grammars 232 with the concepts in the schema (hence the nonterminals in the template CFG that correspond to these concepts) according to user's input through UI 224. Such library grammars may contain, for example, low level domain-independent semantic entities, such as date, time, duration, postal address, currency, numbers, percentages, etc., that can be shared across different applications.

The second way to make template grammar 206 more specific is through grammar learning with annotated samples. This can be done with the help of the robust parser and the semantic annotation of training sentences. Once the template grammar generator 204 has developed template grammar 206 and the grammar manager 230 has augmented the template grammar 206 with the grammar library, it is ready to parse input training sentences. Training sentences (or expressions) can be written by the author or obtained from a database of training expressions, and are represented by block 210 in FIG. 2. In accordance with one embodiment of the present invention, the training sentences are annotated with their semantic structures by the author through appropriate inputs at UI 224. Since the semantic structures are abstractions of the CFG parse tree structures, annotating sentences against the schema is much easier than directly annotating the CFG parse tree structures. Annotation of the training sentences is indicated by block 212 and the annotated expressions are indicated by block 214.

Because the template grammar 206 is greatly under-specified, parses generated with the template CFG are quite ambiguous and performance is generally unacceptable. The annotated data compensate for this by only validating those parse tree structures that comply with the semantic annotation. After the parser finds the parses 216 that comply with the abstract semantic structure, it can learn the CFG rules from the CFG parse tree by aligning the terminal words in the sentence to the pre-terminals in the parse tree. The annotation of the abstract semantic structure provides some anchor points in the CFG parse tree structure by fixing the alignments between the words in the sentences and those non-terminals that correspond to the semantic classes in the semantic annotation. The fixation greatly reduces the search space for possible alignments between input words and pre-terminals of the template grammar that are not annotated in the semantic structure, such that the learning component 218 can effectively learn the alignment between words and pre-terminals. Learning component 218 also invokes syntactic constraints 220 which may further reduce the search space for possible words/pre-terminals alignment. From the learned alignments, new CFG rules 228 are produced by learning component 218 and then used by the grammar manager 230 to augment the template grammar to make it more specific.

Even with these constraints, there may be some additional ambiguity which must be resolved by learner 218. In order to resolve such ambiguity, learner 218 generates user queries or prompts 222 which are passed to UI 224 for display to the user. The user can then provide answers 226 to those queries. The answers 226 are provided to learning component 218, such that learning component 218 can output a learned CFG 228 according to the specified words/pre-terminals alignments. It should be noted that the process can be repeated to employ additional learning. In that case, learned CFG rules in learned CFG 228 are used to augment the template grammar 206. The augmentation results in a new grammar that is more specific. The new grammar is then used by parser 208 in parsing new sentences and expressions to find their annotations; and the learner 218 can learn from the new annotations to continue improving the grammar.

In one embodiment, the annotation of a sentence or expression can be semi-automatically obtained. FIG. 2B illustrates the detailed data flow of expression annotator block 212 in FIG. 2. Users of the development tool can use the grammar learned so far (initially the template grammar augmented with the grammar library) to parse a sentence with robust parser 208. The parser generates a CFG parse tree and maps it to semantic structure annotation 241. The annotation is then displayed to the user via UI 224. Since the grammar at this stage is under-specified, parser 208 may make mistakes. The errors can be corrected by users in block 242 through UI 224 to produce corrected annotation 214, which is then used by the parser again to generate the CFG parse tree that complies with the corrected annotation. From the CFG parse tree, alignment candidates are extracted and sent to learner 218 to identify the correct alignments.

FIGS. 3–11 are screen shots which better illustrate operation of the grammar authoring system in accordance with the present invention.

The user interface (UI) need not take the form illustrated in FIGS. 3–11. However, these figures are exemplary only. In this embodiment, the UI display includes buttons labeled Parse, Save Ann, Learn and Next. The Next button, when actuated by, for example, a point and click device, causes a next training sentence or training expression (the training expressions need not be complete sentences) to be displayed in the field labeled "Sentence To Be Analyzed". The Parse button causes the sentence to be passed to parser 208; and parser 208 generates the semantic annotation. The Save Ann button causes an annotated training expression to be saved, and the Learn button causes learner 218 to learn from the parser generated annotation after it has been corrected by grammar developers.

Figure 3:
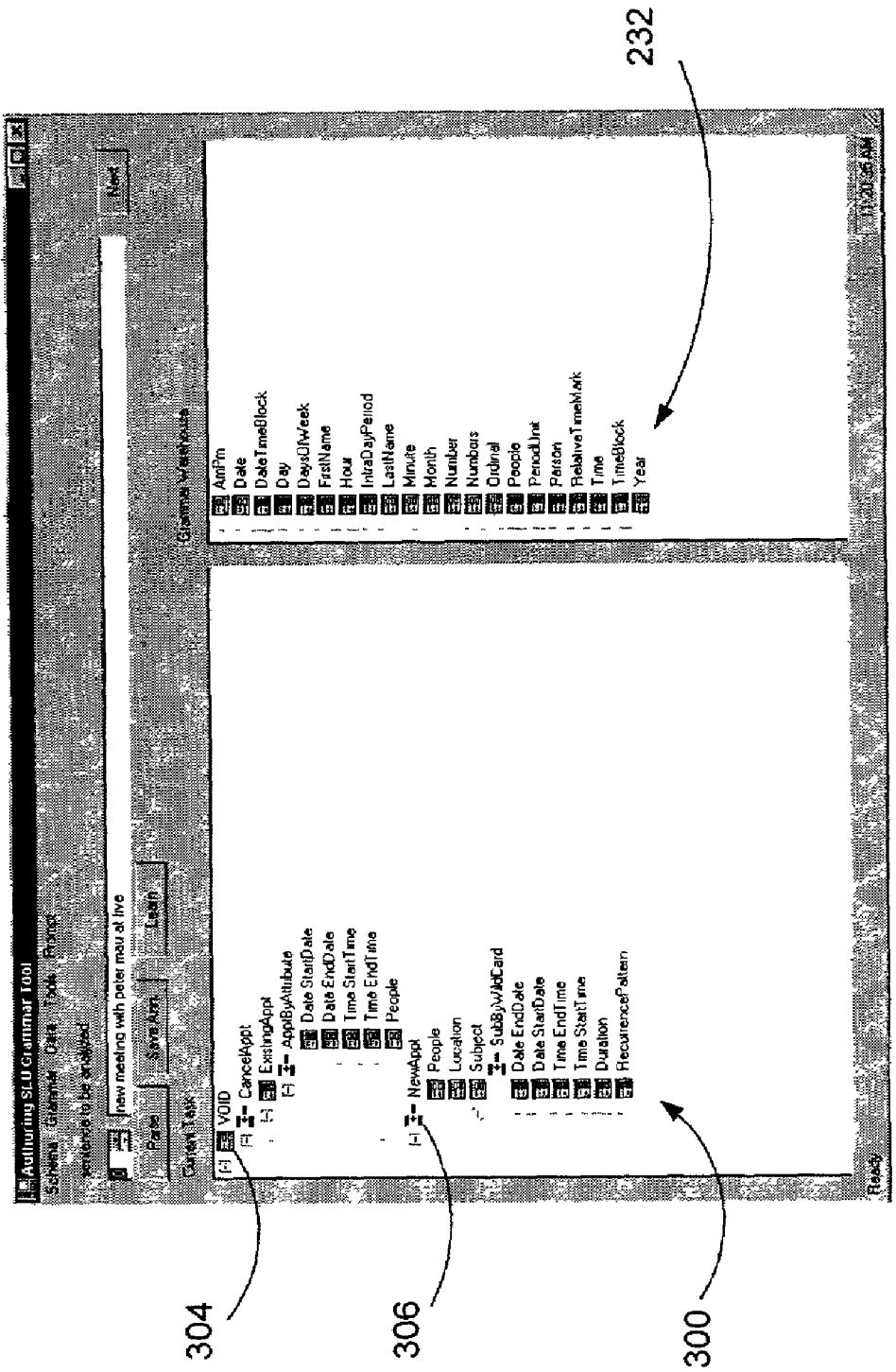
FIGS. 3–11 are screen shots illustrating operation of the authoring system in accordance with one embodiment of the present invention.

FIG. 3 is a screen shot showing a schema 300 along with a set of library grammars 232. The symbols indicated by numbers 304 represent object types while the symbols indicated by numeral 306 represent the actual name of a semantic class, which is followed by the name. Thus, CancelAppt is the name of a semantic class which includes a slot that must be filled by an object that has the type ExistingAppt, for example, an instantiation of the semantic class ApptByAttribute, which has type ExistingAppt. The semantic class ApptByAttribute includes five slots, two of which are dates (StartDate and EndDate), two of which are times (StartTime and EndTime) and one of which identifies People.

Before any parsing is done to produce semantic annotations, the system is provided with the schema 300; and the template grammar generation component 204 develops template grammar 206. The template grammar is then presented to grammar manager 230. The generation of the template grammar can be done in a number of different ways. A short example will be provided for illustrative purposes. Assume that the following is an example of concept definitions in a semantic schema:

```
<entity type="ExistingAppt" name="ApptByAttributes">
    <slot type="People" />
</entity>
<command type="ApptUpdate" name="AddAttendee">
    <slot type="People" />
    <slot type="ExistingAppt" />
</command>
```

In this example, the simplified semantic class ApptByAttributes is an entity with one slot that represents the attendees of an existing appointment. It covers expressions such as: "The meeting with Alex." It has the semantic type ExistingAppt which means that it is one of the many different ways to refer to an existing appointment. Other ways (semantic classes) include ApptByAnaphora (e.g., "that meeting"). The semantic class AddAttendee is a command. It has two slots which simply state that one can add People to an ExistingAppt.

In order to develop the template CFG for this schema, it is assumed that the linguistic constraints that guide the integration of smaller units into a larger unit are invariants for languages used in human-computer interaction. The things that vary are the domain-specific semantics and linguistic expressions for concepts. Thus, this allows one to create a template CFG that inherits the semantic constraints from the semantic schema. The above schema can thus be automatically translated to the following template CFG:

| | |
|---|---|
| <T_ExistingAppt> → <C_ApptByAttributes> | (1) |
| <C_ApptByAttributes> → | |
|   {<ApptByAttributeMods>} <ApptByAttributeHead> | |
|   {<ApptByAttributeProperties>} | (2) |
| <ApptByAttributeProperties> → | |
|   <ApptByAttributeProperty> | |
|   {<ApptByAttributeProperties>} | (3) |
| <ApptByAttributeProperty> → | |
|   <ApptByAttributePeopleProperty> | (4) |
| <ApptByAttributePeopleProperty> → | |
|   {<PreApptByAttributePeopleProperty>} <T_People> | |
|   {<PostApptByAttributePeopleProperty>} | (5) |
| <ApptByAttributeHead> → NN | (6) |

-continued

```
<PreApptByAttributePeopleProperty> → .*            (7)
<PostApptByAttributePeopleProperty> → .*           (8)
<T_UpdateAppt> → <C_AddAttendee>
<C_AddAttendee> →
    <AddAttendeeCmd> {<AddAttendeeProperties>}
<AddAttendeeCmd> → .*
<AddAttendeeProperties> →
    <AddAttendeeProperty> {<AddAttendeeProperties>}
<AddAttendeeProperty> → <AddAttendeePeopleProperty> |
    <AddAttendeeExistingApptProperty>
<AddAttendeeExistingApptProperty> →
    {<PreAddAttendeeExistingApptProperty>}
    <T_ExistingAppt>
    <PostAddAttendeeExistingApptProperty>
<AddAttendeePeopleProperty> →
    {<PreAddAttendeePeopletProperty>} <T_People>
    {<PostAddAttendeePeopletProperty>}
<PreAddAttendeeExistingApptProperty → .*
<PostAddAttendeeExistingApptProperty → .*
<PreAddAttendeePeopleProperty → .*
<PostAddAttendeePeopleProperty → .*
```

In this example, rules are numbered in the right margin. An entity, such as ApptByAttribute, includes a head, optional (braced) modifiers which appear in front of the head (e.g., "Alex's meeting"), and optional (braced) properties that follow the head (e.g., "meeting with Alex") illustrated by rule 2. Both modifiers and properties are defined recursively, so that they finally incorporate a sequence of different slots as illustrated by rules 3 and 4.

Each slot is bracketed by an optional preamble and postamble, such as shown by rule 5. The heads, preambles and postambles are originally place holders illustrated by (.*) in rules 7 and 8. Some place holders are specified with part-of-speech constraints (e.g., a head must be a NN (noun)), such as shown by rule 6.

For a command like AddAttendee, the template starts with a command part <AddAttendeeCmd> followed by <AddAttendeeProperties>. The rest is very similar to that of the template rules for an object. The template sets up the structural skeleton of a grammar. Hence, the task of grammar learning becomes to learn from examples the expressions for the preterminals like heads, commands, preambles, etc. The placeholders, without learning, can match anything. However, the performance is unacceptable because the under-specificity of the grammar results in ambiguities.

The non-terminal <T_People> is application dependent and therefore will be provided by the developer, for example, in the form of a name list.

Given that the parser 208 already has a template grammar (developed as described above) which inherits the syntactic constraints of the schema, the user may now enhance the grammar with pre-existing library grammars. This can be done by dragging library grammars from the library 302 across the screen to the appropriate object type or semantic class such as by using a point and click device.

Figure 4:
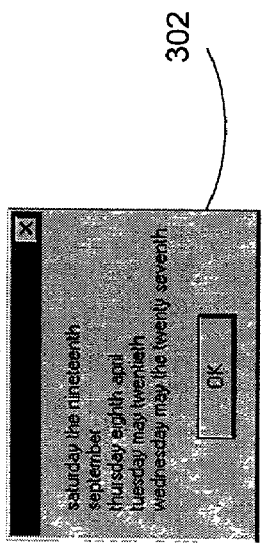

However, based on the simplified list of library grammars 232, it may be difficult for the author to determine what is actually contained in those library grammars. Therefore, by entering an appropriate user input, the user can cause one of the library grammars 232 to operate in the generative mode thereby generating examples of sentence fragments or expressions which are supported by that particular CFG. In one illustrative embodiment, the user simply needs to place the point and click cursor over the grammar in the list of library grammars 232 and right click, and a display box 303, as shown in FIG. 4, appears which displays examples of sentence fragments or expressions that are supported by the CFG selected by the user. In the example illustrated, box 303 is generated for the "PreciseTime" library grammar and shows a number of different expressions that are generated using that grammar.

Figure 5:
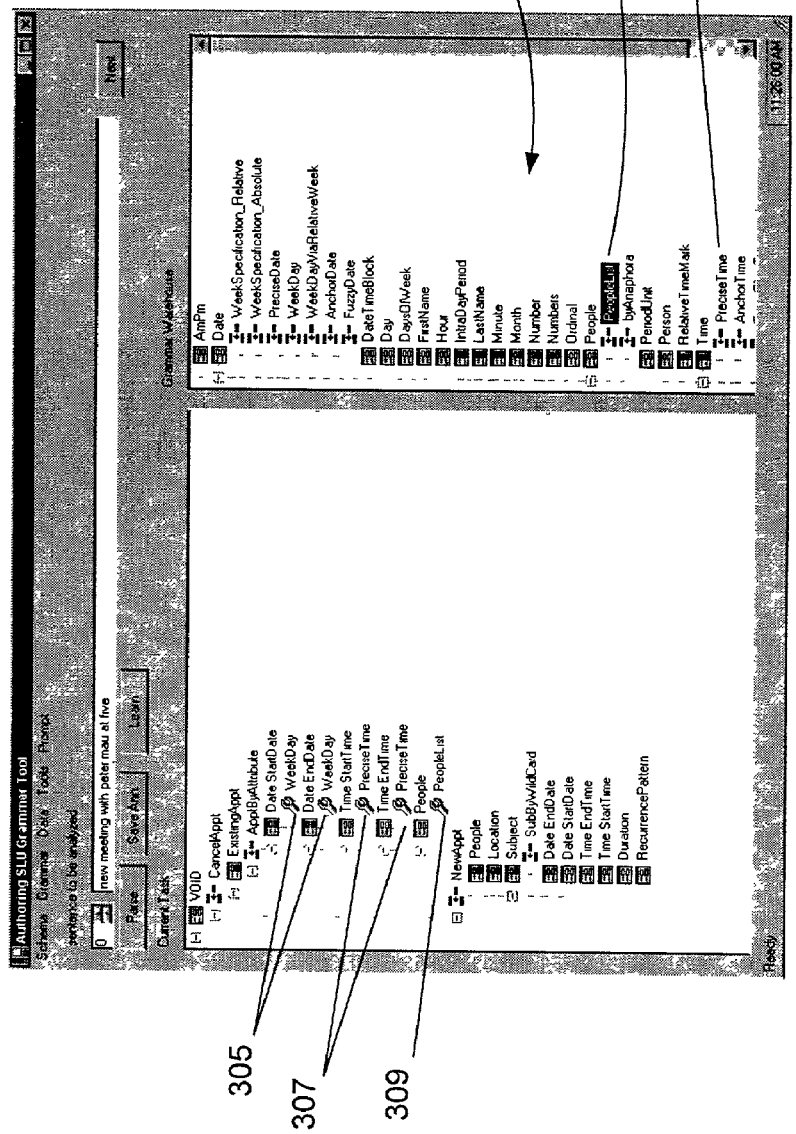

FIG. 5 shows the same screen shot as that shown in FIG. 3 except that the schema on the left has now been augmented with a plurality of library grammars from list 232. In order to find the various semantic classes in each of the grammars in the list of library grammars 232, the user can simply right click on any of the icons representing the library grammars. In one illustrative example, the user has clicked on the Date grammar, the People grammar and the Time grammar. The semantic classes contained in each grammar are then displayed. The user can then drag the specific semantic classes from list 232 to the schema on the left hand side of the screen and place them (by dropping them) in the appropriate object types or slot types.

In FIG. 5, it can be seen that the user has dragged the Weekday library grammars 305 from list 232 to the grammar displayed on the left side of FIG. 5. It can also be seen that the user has dragged the PreciseTime grammar 307 from the list 232 and placed it in the grammar illustrated on the left side of FIG. 5 as well. Finally, it can be seen that the user has dragged the PeopleList grammar 309 from the list of grammars 232 to the left side as well.

In dragging and dropping grammars from list 232 to the schema for the grammar being developed on the left side of screen 5, this causes a suitable user input to be provided from UI 224 (FIG. 2) to grammar manager 230. Grammar manager 230 then associates the selected library grammar with the CFG being developed by the system.

Figure 6:
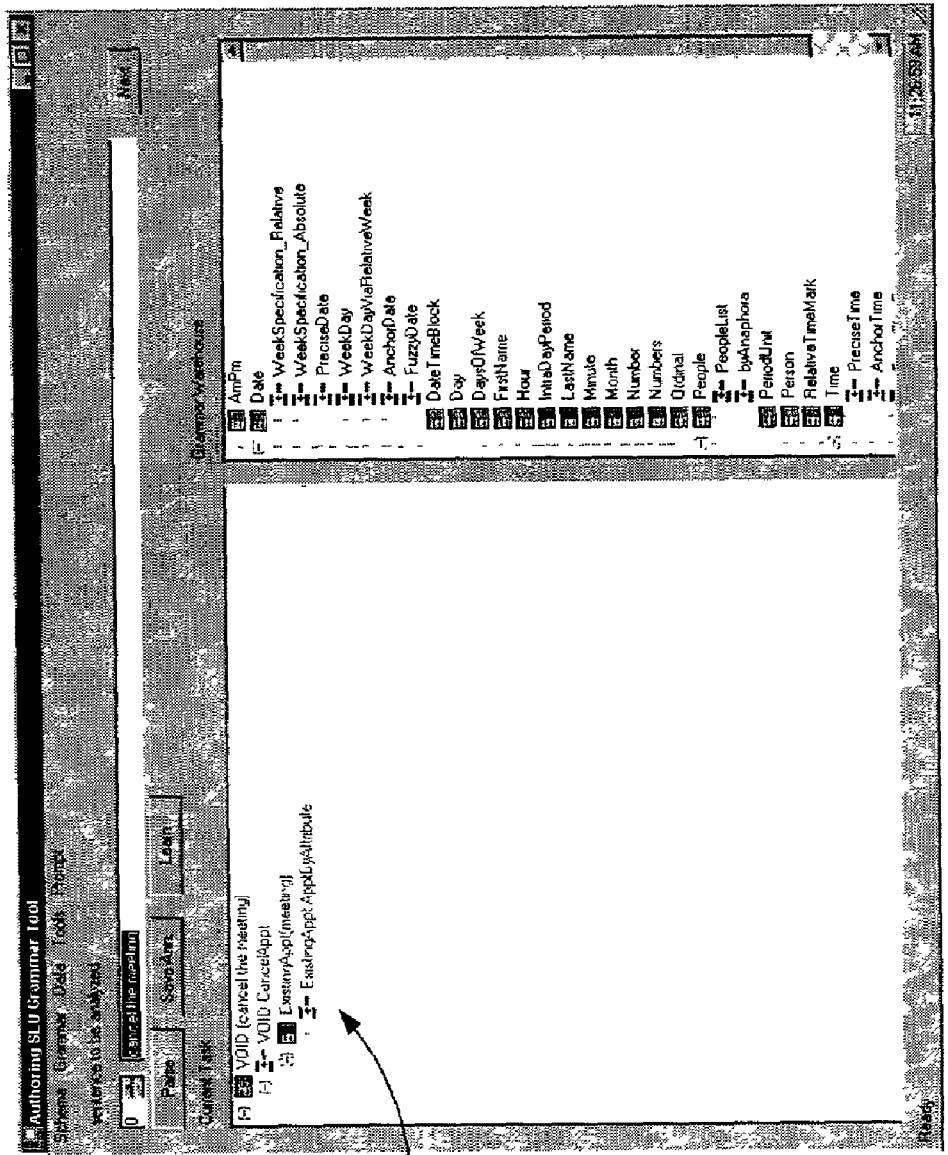

FIG. 6 illustrates another embodiment of the present invention which includes annotation. In order to annotate a training sentence or training expression, the user first clicks the Next button on the user interface such that a new training sentence or training expression is displayed in the field entitled "Sentence To Be Analyzed". Of course, the user can simply type the sentence in as well. In any case, once the next training sentence or training expression is located in the field, the user can drag and drop that sentence to a specified semantic class displayed on the left hand side of the screen.

This causes UI 224 (FIG. 2) to send a command to parser 208 to parse the segment with the specified semantic class. Parser 208 then parses the sentence into the CFG parser tree, and the CFG parse tree is then abstracted into the semantic structure annotation, which is displayed in the example in FIG. 6, in which parser 208 has found the correct semantic structure by filling the ExistingAppt slot in the CancelAppt semantic class with the term "meeting".

Another annotation example may be helpful. The annotation provides anchor points in the alignments which must be complied with. Therefore, they segment the search space for alignment and enable the learner to focus on local points of interest. For example, suppose that the following training sentence is used. "Schedule a meeting with Peter at 3 PM" Further suppose that the following annotation has been input:

```
<command name="NewMeeting" type="ApptUpdate">
    <slot type="Time" name="StartTime"
        text="3 PM" />
    <slot type="Person" name="Attendees"
        text="Peter" />
</command>
```

Then, the parser abides by these constraints and generates the parse tree (without making the commitment to map terminal words to the pre-terminals unless such a mapping is specified in the annotation) shown in FIG. 6A, with the following leaf nodes:

ScheduleMeetingCmd PreAttendeeProperty|Attendee/Peter|PostAttendeeProperty PreTimeProperty|Time/3PM|PostTimeProperty The constraints from the annotation divide the possible alignment space into three parts, so the words "Schedule a meeting with" can only match "ScheduleMeetingCmd" and "PreAttendeeProperty", and "at" can only match PostAttendeeProperty and PreTimeProperty. Thus, the annotation process provides anchor points which are known to be correct and significantly reduce the search space required of the learner.

The learner can also use syntactic clues 220 (FIG. 2) to align words to preterminals. For example, in one embodiment, prepositions and determiners can only combine with the word behind them. Therefore, "at" can only be aligned with "PreTimeProperty". Therefore, the following two rules will be introduced:

PreTimeProperty→at

The syntactic constraints may be based on part of speech or any other desired syntactic constraints as well.

Figure 7:
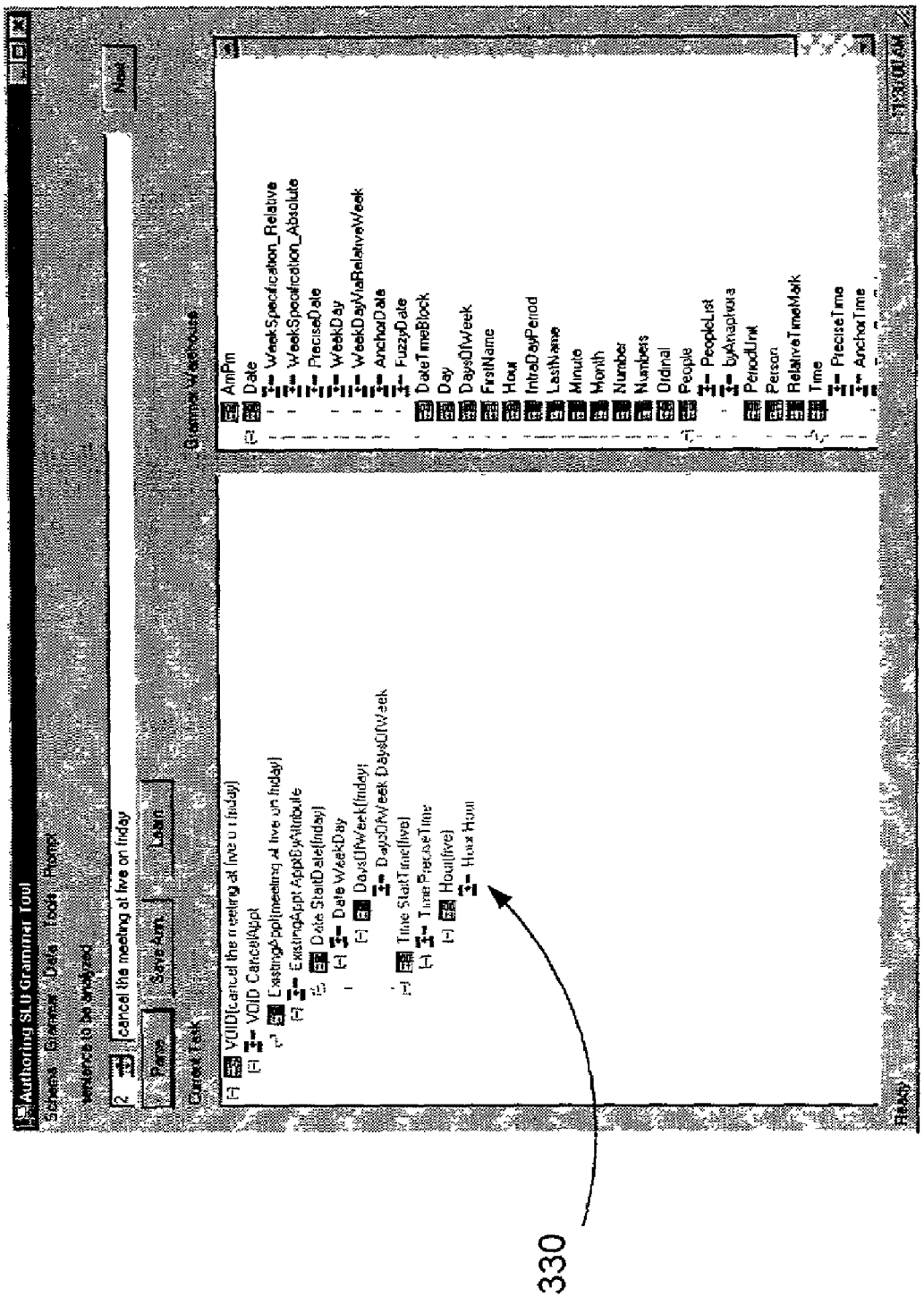

FIG. 7 illustrates another way in which the user can force the parser 208 to parse a non-annotated sentence in order to produce the annotation for grammar learning. First, the user simply clicks the Next button and a new training expression appears in the field labeled "Sentence To Be Analyzed". The user then clicks the Parse button and an input is generated from UI 224 passing the training sentence to parser 208 and causing it to parse the sentence. The CFG parse is then abstracted into semantic structure and the structure is displayed at 330. It can be seen that parser 208 has correctly parsed the training sentence. Thus, the user can cause learning component 218 to learn from this parse by depressing the Learn button. Assuming there are no ambiguities remaining in the parse, learning component 218 learns additional relationships from the parse generated by parser 208. After learning the relationships, learner 218 generates the CFG rules representing those relationships.

Figure 8:
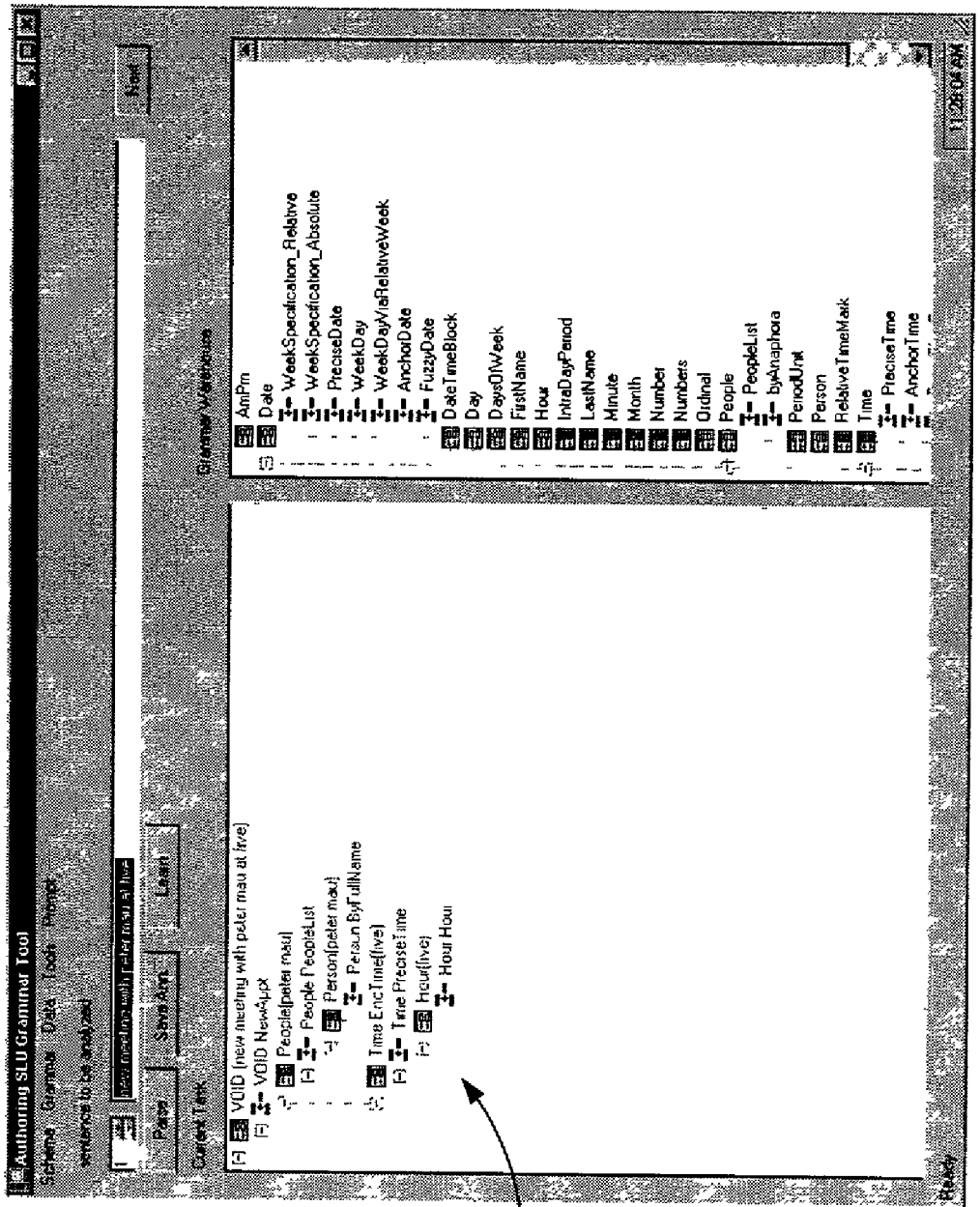

FIG. 8 illustrates another embodiment in which the user can further annotate the training sentence by correcting the parse. In FIG. 8, it is assumed that the user has depressed the Next button to obtain a new training sentence "New meeting with Peter Mau at five." It is also assumed that the user has dragged that sentence to the NewAppt semantic class. Parser 208 thus attempts to parse the sentence using the specified type or semantic class and outputs an abstracted semantic structure 332. It can be seen that the parser has made one mistake. The parser has mistakenly parsed the hour ("five") as an EndTime rather than as a StartTime for the referenced meeting. This can be corrected by the author.

Figure 9:
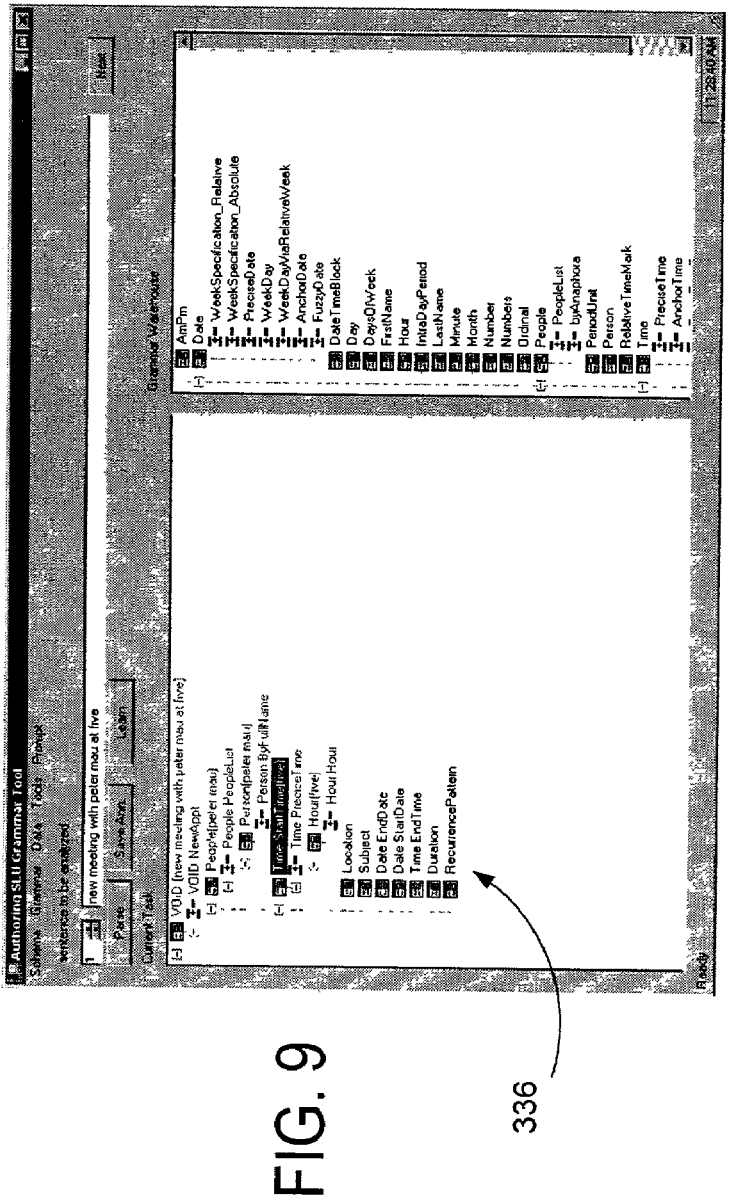
Figure 10:
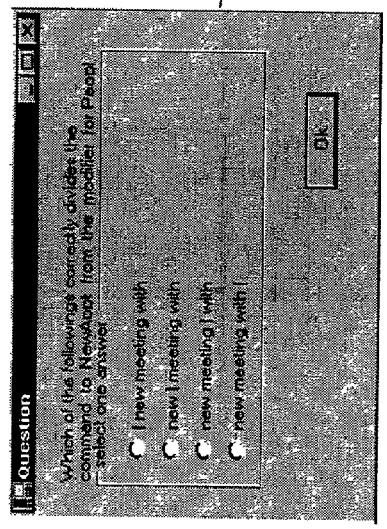
Figure 11:
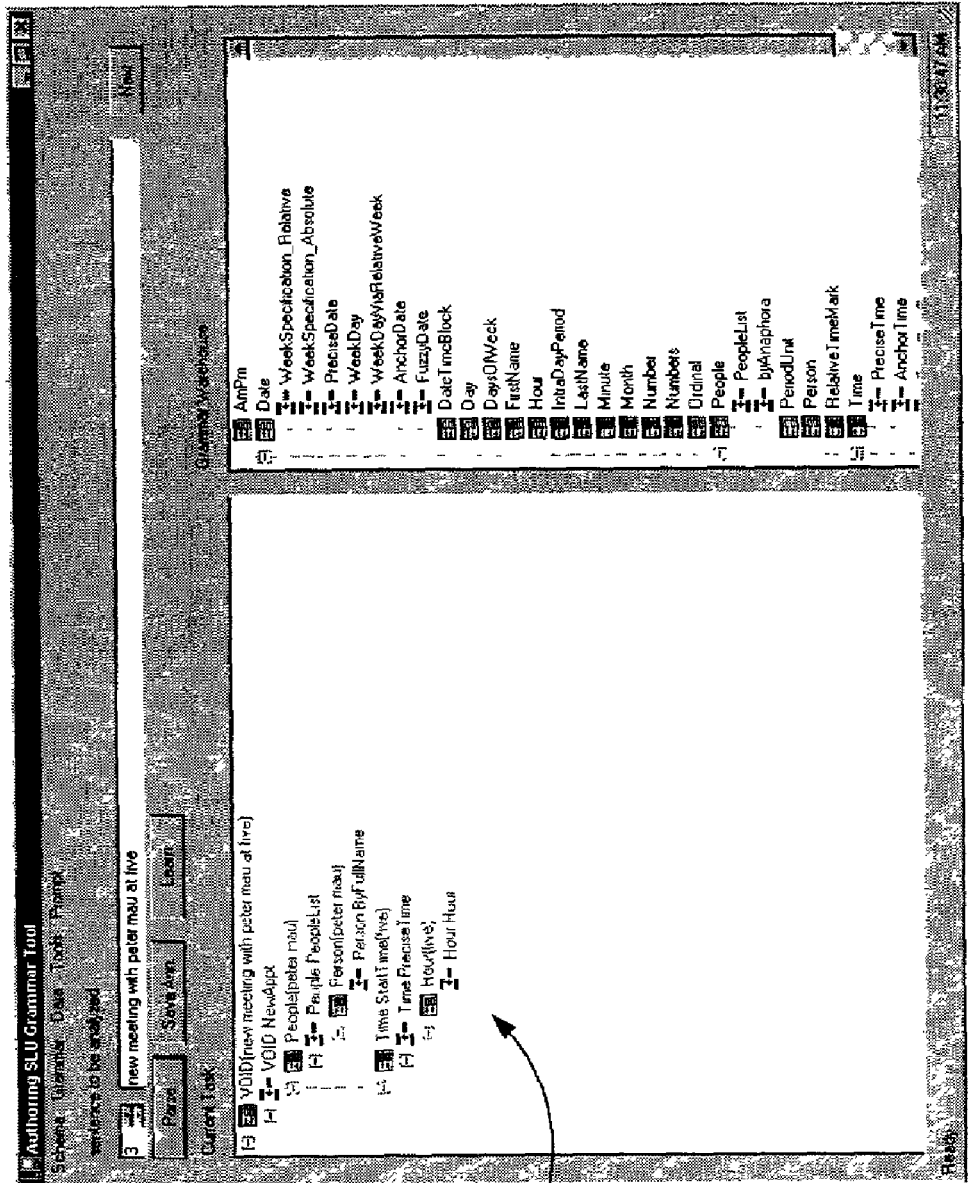

FIG. 9 illustrates how the parse tree shown in FIG. 8 is corrected. In FIG. 9, the user has right clicked on the semantic class NewAppt, and this causes the UI to show all slots for the semantic class, including StartTime. The user then drags the incorrectly parsed hour and drops it on the StartTime slot. This correction thus annotates the hour correctly such that the semantic annotation is modified as shown at 336. The user can thus depress the Learn button such that the learning component learns from this correct parse.

As the learning component attempts to learn from this annotation and generates the necessary CFG rules, it encounters an ambiguity with the un-annotated portions of the training sentence. For example, the learning component still does not have information which allows it to determine where the words "new meeting with" should be placed in the alignment with the grammar. The parser cannot determine how to correctly divide this text fragment between the command for a NewAppt and the modifier for People. In other words, the system cannot tell which of the words "New meeting with" go with the command for a new meeting and which words modify the person Peter. Thus, the system allows the user to choose. Learning component 218 generates a user prompt 222 shown in FIG. 10. In the user prompt, the user is asked to identify a particular text string with the appropriate segmentation as indicated by a vertical line placed somewhere within the text segment. This basically causes the user to further annotate the training sentence such that the learner can complete the parse with no ambiguities.

Of course, in order to accomplish this correction process, appropriate inputs are generated by UI 224 in FIG. 2 to the various components in the system. After the learner has completed learning from the annotation, the user can then again ask the system to parse the very same sentence by simply depressing the Parse button and the parse tree 340 shown in FIG. 11 will be generated, illustrating that the system has learned from the annotated parse previously generated.

Another feature should also be mentioned. An authoring tool in accordance with the present invention illustratively includes a selectable grammar field 342. By clicking on the selectable grammar field, UI 224 receives, and displays, the particular grammar which was used in the parse 340 then being displayed. This allows the user to ensure that the correct grammars are being utilized during the parsing operation.

It should be noted that UI 224 can interact with the remainder 199 of the system 198 in accordance with a variety of different ways. Table 1 includes one exemplary protocol which defines the interaction between UI 224 and the remainder of the system. Of course, other or additional protocols could be used as well.

TABLE 1

[helpstring("method LoadSDL: Ask server to load the Semantic Schema [in Semantic Description Language] file.")]
 HRESULT LoadSDL([in] BSTR SDLfname);
 [helpstring("method LoadGramLibrary: Tell FastLearner to load the library grammar.")]
HRESULT LoadGramLibrary([in] BSTR Libfname);
[helpstring("method Save: Save the learned grammar.")]
HRESULT Save ( );
[helpstring("method SaveAs: Save the learned Grammar to the Specified File.")]
HRESULT SaveAs([in] BSTR FileName);
[helpstring("method ViewGrammar: Ask the server to show the learned CFG.")]
HRESULT ViewGrammar( );
[helpstring("method GetLibrarySample: Ask FastLearner to generate n [input parameter] samples for a library grammar non-terminal. The output samples are separated with '|'.")]
HRESULT GetLibrarySample([in] BSTR NT, [in] int n, [out,retval] BSTR* Samples);
[helpstring("method LoadGrammar: Load a pre-learned grammar. The first [input] parameter specifies the grammar file name.")]

TABLE 1-continued

```
HRESULT LoadGrammar([in] BSTR fname);
[helpstring("method ParseSegment: Ask FastLearner to
parse the sentence segment with the non-terminal
rootNT as the start symbol. Output is parenthesized
parse tree.")]
HRESULT ParseSegment([in] BSTR rootNT, [in] BSTR
segment, [out,retval] BSTR* parseTree);
[helpstring("method Associate: Associate a CFG
nonterminal with a slot in a semantic schema.")]
HRESULT Associate([in] BSTR slot, [in] BSTR CFG_NT);
[helpstring("method Unassocaite: Unassociate a CFG
nonterminal from a slot in a semantic schema.")]
HRESULT Unassocaite([in] BSTR slot, [in] BSTR
CFG_NT);
[helpstring("method LearnAnnotation: Let FastLearner
start learning from the annotation. If FastLearner
finds ambiguities it cannot resolve, the out
parameter fAmbi will be 1. Otherwise it will be set
to 0.")]
HRESULT LearnAnnotation([in] BSTR sentence, [in] BSTR
annotation, [out,retval] int* fAmbi);
[helpstring("method AskQuestion: When parse is
ambiguous, let FastLearner ask questions. If fYNQ=1,
it is a Y/N question. Otherwise it is a multiple
choice questions. '/' is used to separate question
and choices for multiple choice questions.")]
HRESULT AskQuestion([out] int* fYNQ, [out,retval]
BSTR* question);
[helpstring("method LearnFromAnswer: Present
FastLearner the answer to the question asked. The
answer is 0|1 if the question is Y/N. Otherwise it
will return the choice number (1 . . . n). The output
fAmbi is 1 if there are still ambiguities
remaining.")]
HRESULT LearnFromAnswer([in] int answer, [out,
retval] int* fAmbi);
[helpstring("method BatchAnnotationLearning: Send
FastLearner a file that contains a list of
annotated sentences (list of pairs of sentence string
and parenthesized annotation string in separate
lines) to start the batch learning.")]
HRESULT BatchAnnotationLearning([in] BSTR annoFile);
[helpstring("method ParseWithType: Parse the segment
with the specified type. REluts in parenthesized tree
representation.")]
HRESULT ParseWithType([in] BSTR type, [in] BSTR
segment, [out, retval] BSTR*
ParseTree);
```

It can be seen that the present invention provides one or more significant advantages. One of these is the abstraction of semantic structures from the CFG parse tree structures. While prior art has used syntactic annotation in grammar learning, the syntactic annotation is CFG dependent; therefore it is too expensive and error prone. The present invention only asks users to annotate sentences against the schema to generate the semantic annotation, which is transparent to the linguistic CFG grammar and can be easily performed by a developer with good understanding of the application that he is developing.

In addition, the present invention uses the parser to guide annotation. One common problem with manual semantic annotation is inconsistency. For example, some annotators annotated "at 5:00" as the start time, while others simply annotated "5:00" as the start time. By relieving the author of the task of expressly writing out each and every one of these items, and by instead allowing the author to simply drag a portion of the text to a semantic class and allowing the parser to parse the text using the semantic text, the parser will always write the term the same way. In other words, the parser may be configured to never write the term "at 5:00" as the start time and then later write the term "5:00" as the start time. Thus, the present invention invokes the parser to eliminate inconsistency in authoring.

Using the parser to guide annotation not only results in increased consistency, but also saves time. For example, the user can drag an entire sentence or sentence fragment to one semantic class. The parser will then parse that sentence or sentence fragment utilizing the semantic class. This allows the user to annotate only at a high level (e.g., at the semantic class level) and allows the parser to do lower level annotation.

In addition, the present invention constrains the parser with the annotation. In other words, once an annotation is made, the parser knows which non-terminals should be activated based on the annotation. This significantly reduces the search space for the parser in parsing the training sentence.

The present invention also uses the library grammars in a generative mode to generate examples. This is very useful in determining whether the library grammar should be used in a particular application.

In addition, the present invention develops a template grammar from the semantic schema, which inherits the semantic constraints of the semantic schema. The template grammar provides structural generalization such that the learned grammar can be used to parse new sentences with structures different from those in the training data. Since the template grammar follows a simple paradigm, its structure is easy to read and maintain. Using the template grammar and library grammars, the parser can obtain a parse that can help users to annotate sentences for grammar learning.

The present invention also prompts the user to solve ambiguity in developing the CFG. The present invention further uses syntactic constraints in the learning process to further reduce the search space for learning.

Although the present invention has been described with reference to particular embodiments, workers skilled in the art will recognize that changes may be made in form and detail without departing from the spirit and scope of the invention.

What is claimed is:

1. A method of building a learned context free grammar (CFG) for an application, comprising:
   generating a semantic schema for the application, the semantic schema having associated semantic constraints;
   generating a template grammar based on the semantic schema such that the template grammar inherits the semantic constraints associated with the semantic schema; and
   building the learned CFG by parsing training expressions using the template grammar, by:
      obtaining a training expression;
      parsing the training expression to produce a parse result;
      displaying an abstraction of the parse result; and
      receiving a correction input indicative of a direct user correction to the parse result, wherein the correction input annotates at least one anchor point that is a known correct alignment between the training expression and a preterminal in the template grammar, and wherein receiving the correction input comprises:
         receiving a selection input selecting an incorrectly aligned portion of the training expression in the parse result;

receiving a movement input indicative of a user dragging the incorrectly aligned portion to a correct object in the abstraction of the parse result; and receiving a placement input indicative of a user dropping the incorrectly aligned portion on the correct object in the abstraction of the parse result.

2. The method of claim 1 and further comprising:

re-parsing the training expression to produce a new parse result that complies with the anchor point; and displaying a new abstraction of the new parse result.

3. A method of building a learned context free grammar (CFG) for an application, comprising:

generating a semantic schema for the application, the semantic schema having associated semantic constraints;

generating a template grammar based on the semantic schema such that the template grammar inherits the semantic constraints associated with the semantic schema; and building the learned CFG by parsing training expressions using the template grammar, by:

obtaining a training expression;

parsing the training expression to produce a parse result;

displaying an abstraction of the parse result; and receiving a correction input, indicative of a direct user correction to the parse result, and wherein building the learned CFG further comprises associating at least one pre-existing library grammar with the template grammar based on a user input.

4. The method of claim 3 wherein associating at least one pre-existing library grammar with the template grammar comprises:

selecting one of a plurality of available library grammars; and operating the selected library grammar in a generative mode to generate at least one example of an expression supported by the selected library grammar.

5. The method of claim 3 wherein building the learned CFG comprises:

simultaneously displaying an indication of the semantic schema and an indication of available library grammars;

selecting one of the library grammars;

dragging the selected library grammar to a desired place in the semantic schema;

dropping the selected library grammar; and associating the selected library grammar with the template grammar.

6. A method of building a learned context free grammar (CFG) comprising:

generating a semantic schema for the learned CFG;

obtaining a template CFG;

receiving a training expression;

obtaining an annotated expression by receiving a user annotation input annotating the training expression directly against the semantic schema to provide at least one anchor point that is a known correct alignment between a portion of the training expression and the template CFG;

parsing the annotated expression to provide a parse result that complies with the anchor point; and building the learned CFG based on the parse result.

7. The method of claim 6 wherein obtaining a template CFG includes generating a template CFG based on the semantic schema, and wherein parsing the annotated expression comprises:

parsing the annotated expression with the template CFG.

8. The method of claim 7 wherein building the learned CFG comprises:

learning alignments of a remainder of the training expression, other than the portion aligned at the anchor point, with the template CFG.

9. A system for developing a domain-specific, context free grammar (CFG), comprising:

a template grammar generator receiving a semantic schema and generating a template grammar that inherits the semantic constraints from the semantic schema;

an annotation interface receiving a user annotation input indicative of a user designated anchor point that is an alignment of at least a portion of a training expression with the semantic schema;

a parser, coupled to the template grammar generator and the annotation interface, receiving the template grammar and the user annotation input and parsing the training expression to provide a parse result that complies with the anchor points; and a learner, coupled to the parser, learning the domain-specific CFG based on the parse result.

10. The system of claim 9 and further comprising:

a grammar manager configured to access a library of pre-existing grammars, to receive a user association input, and to associate a selected pre-existing grammar with the learned CFG based on the user association input.

11. The system of claim 10 wherein the learner is configured to operate at least one of the pre-existing grammars in a generative mode generating examples of expressions supported by the pre-existing grammar.

12. The system of claim 9 wherein the learner is configured to resolve ambiguities in the parse result by prompting a user for additional alignment inputs, in addition to the anchor point, to align the training expression with the template grammar.

13. The system of claim 9 wherein the learner is configured to employ predetermined syntactic constraints in learning the learned CFG to limit portions of the training expression for which alignments with the template CFG must be learned.

14. A method of generating a context free grammar (CFG), comprising:

generating an underspecified template CFG;

annotating a training expression, against an abstraction of the template CFG, with one or more anchor points aligning portions of the training expression with pre-terminals in the CFG;

parsing the training expression with the template CFG to provide a parse result, given the anchor points;

learning alignments of the training expression with the template CFG, in addition to the anchor points; and adding CFG rules to the template CFG to reflect the learned alignment and anchor points.

15. The method of claim 14 and further comprising: receiving user correction inputs indicative of a user correction of the parse result.

16. The method of claim 15 wherein learning alignment comprises:
  accessing pre-existing syntactic constraints; and
  utilizing the pre-existing syntactic constraints to learn the alignments by limiting portions of the training expression for which alignments with the template CFG must be learned.

17. The method of claim 15 wherein learning alignments comprises:
  using the user correction of the parse result as an anchor point.

18. The method of claim 14 wherein learning alignments comprises:
  identifying ambiguities in the parse result; and
  prompting user alignment inputs to disambiguate the ambiguities.

19. The method of claim 14 and further comprising:
  associating pre-existing library CFG rules with the template CFG based on a user association input of the pre-existing library CFG rules with the abstraction of the template CFG.

20. The method of claim 19 wherein the user association input comprises:
  dragging a graphic representation of a pre-existing library CFG containing the pre-existing library CFG rules from one portion of a display to another portion of the display that is a desired place in a graphic representation of the abstraction of the template CFG; and
  dropping the graphic representation of the pre-existing library CFG at the desired place.

21. A method of generating a context free grammar (CFG) for an application in an application domain, comprising:
  generating an underspecified template CFG;
  displaying a schema of the application domain instead of the CFG;
  receiving a user input directly annotating a training expression against the schema instead of the template CFG, identifying one or more points of alignment between the training expression and the template CFG;
  parsing the training expression with the template CFG to provide a parse result that complies with the points of alignment;
  learning alignments of the training expression with the CFG; and
  adding CFG rules to the template CFG to reflect the learning alignments.

* * * * *